(No Model.) 2 Sheets—Sheet 2.

E. W. RICE, Jr.
ELECTRIC LOCOMOTIVE.

No. 546,191. Patented Sept. 10, 1895.

Witnesses.
A. F. Macdonald.
[signature]

Inventor—
E. W. Rice, Jr. by
Geo. B. Blodgett,
Atty.

UNITED STATES PATENT OFFICE.

EDWIN W. RICE, JR., OF SCHENECTADY, NEW YORK, ASSIGNOR TO THE GENERAL ELECTRIC COMPANY, OF NEW YORK.

ELECTRIC LOCOMOTIVE.

SPECIFICATION forming part of Letters Patent No. 546,191, dated September 10, 1895.

Application filed March 16, 1895. Serial No. 542,017. (No model.)

*To all whom it may concern:*

Be it known that I, EDWIN W. RICE, Jr., a citizen of the United States, residing at Schenectady, in the county of Schenectady, State of New York, have invented certain new and useful Improvements in Electric Locomotives, of which the following is a specification.

The object of the present invention is to provide an electric locomotive which shall be self-contained and mounted on suitable trucks provided with motors for propelling the same and means for regulating their speed. Such a locomotive can run on existing railway-tracks without going to the expense of installing a central station and maintaining an outside line construction either overhead or underground.

In general, my invention consists in a self-contained electric locomotive carrying a boiler capable of furnishing the desired amount of steam, which is fed to a prime mover of any desired character, preferably, a compound condensing-engine or a steam-turbine, which drives a direct-current generator supplying current to a rotary transformer, which in turn supplies alternating currents to the motors, the motors being suitably mounted on the car-axles or geared thereto. The regulation of these motors is obtained wholly or partly by varying the periodicity of the current supplied thereto, and I accomplish this by varying the amount of energy supplied to the prime mover by varying the field excitation of the generator, and consequently its potential, by varying the field excitation of the transformer or by other means of suitably controlling the speed of the rotary transformer.

Figure 1:
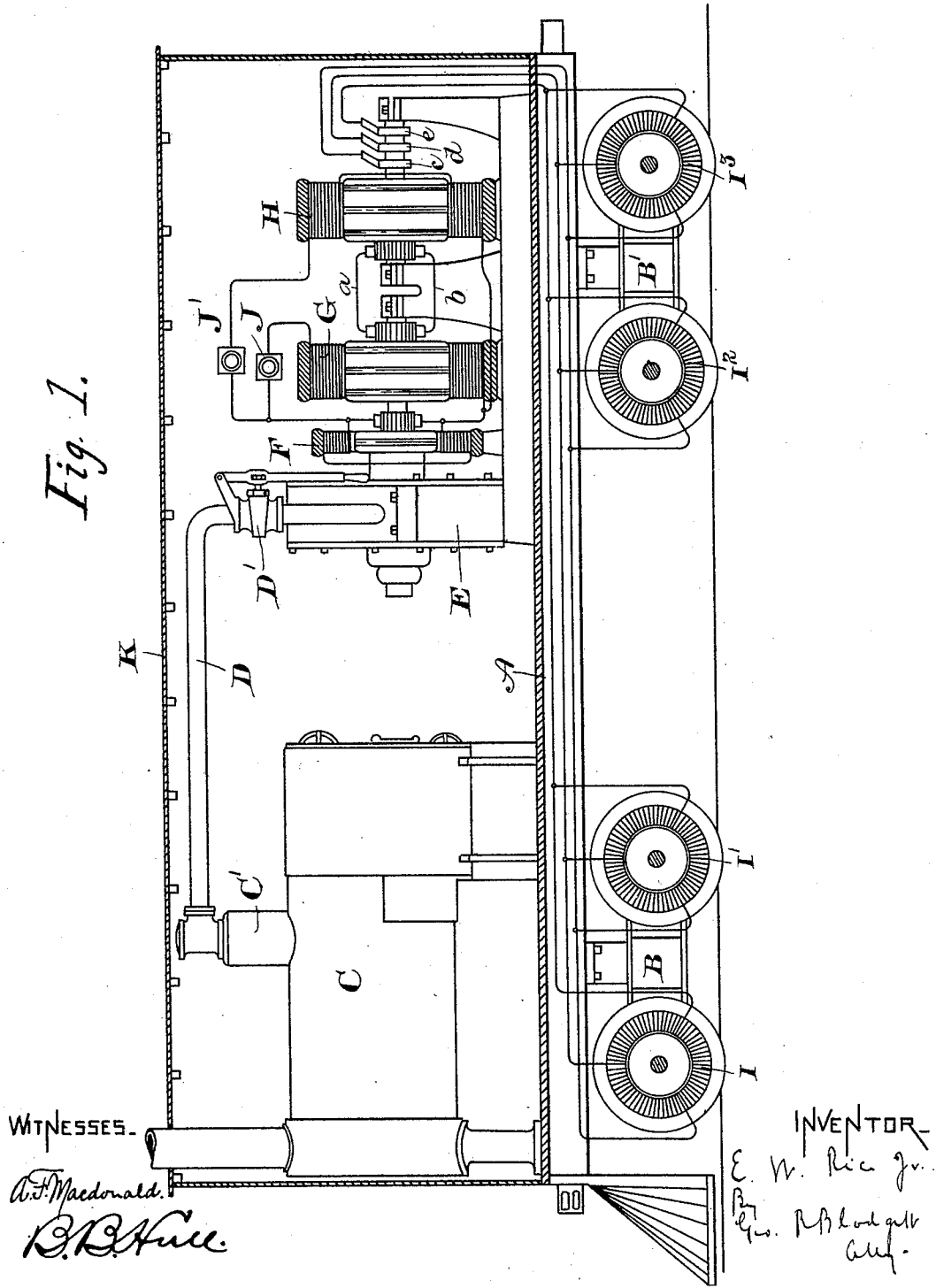
Figure 2:
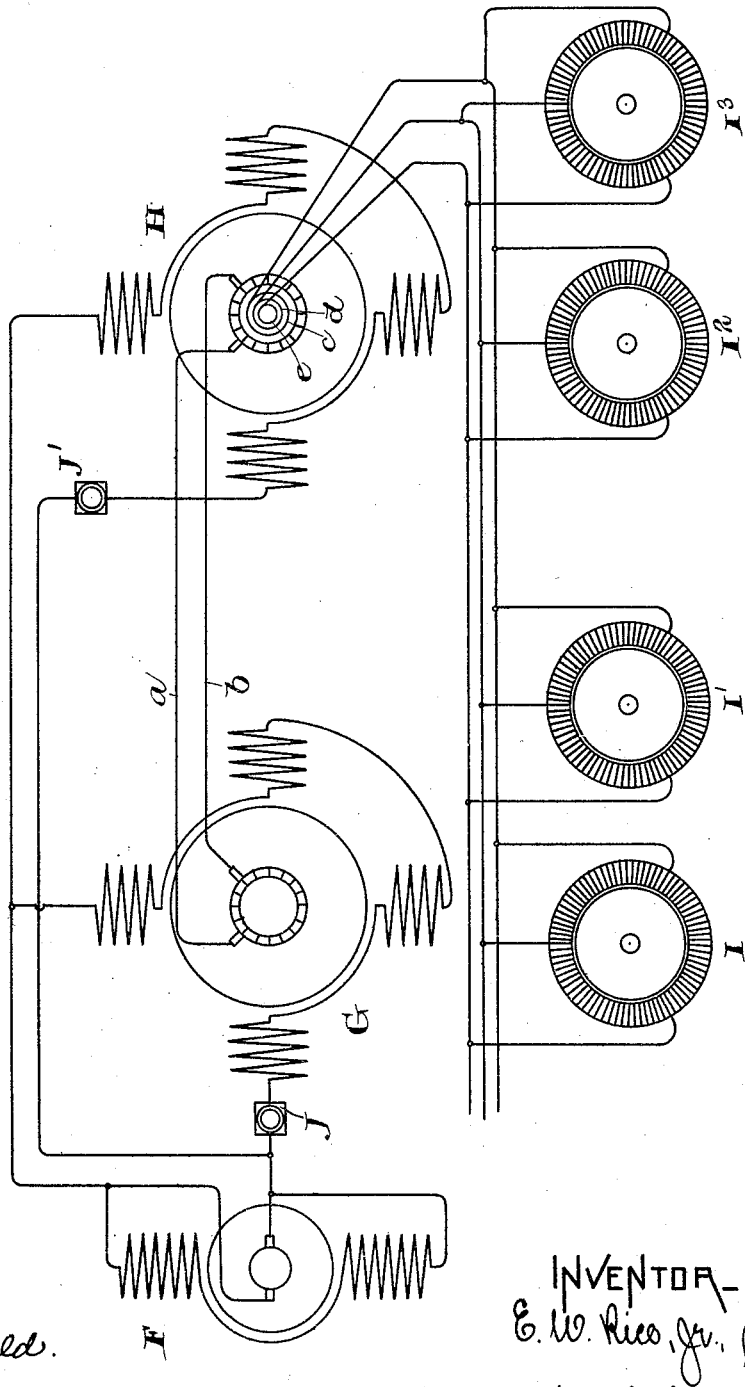

In the accompanying drawings, attached to and forming a part of this specification, Figure 1 shows, partly in side view and partly in section, a locomotive embodying my invention. Fig. 2 is a diagram of the circuits.

A is the base of the locomotive suitably mounted on trucks B B', which are provided with three-phase alternating induction motors mounted directly on the car-axles; but I do not limit myself to this exact construction, for any alternating-current motor can be used and either geared to or mounted directly on the car-axle, the motors being as many in number as are advisable in any special case.

C is the boiler provided with a suitable fire-box. It is, of course, understood that the fuel and water may or may not be carried directly on the locomotive. K is the cab inclosing the entire apparatus. From the steam-dome C' on the boiler is run the main steam-pipe D, provided with a valve D', to vary the amount of steam admitted to the steam-turbine E, to which is directly coupled the exciter F and the direct current-generator G. Mounted on the same base, but not mechanically connected thereto, is a rotary converter H wound in any well-known manner, which is adapted to transform the continuous current taken from the generator G into alternating currents to supply the motors I I' $I^2$ $I^3$, which are mounted on the axles of the trucks B B'. The exciter F is of the usual shunt-wound variety and supplies current to the field of the generator G and transformer H, and these are independently controlled by means of resistance-boxes J J'. In starting the locomotive steam would be admitted to the turbine E, which would cause the exciter F and generator G to generate current, and the current from the generator G passes to the armature of the transformer H by means of leads $a$ $b$, and thence, when transformed, to motors I I' $I^2$ $I^3$. If, for example, there is a difference of ten volts between $a$ and $b$, and the field of the transformer H has a certain excitation, the currents taken from the collecting-rings $c$ $d$ $e$ will have a certain frequency depending upon the speed of rotation of the armature and the number of field-poles, which will cause the motors to revolve at a certain speed. Now by varying the potential of the generator G, or by causing the turbine to speed up, I am enabled to raise the frequency of the currents in the transformer, due to the increased speed, thus increasing the speed of the motors I I' $I^2$ $I^3$. Within certain limits the speed of the motors may be varied by varying the excitation of either the field-magnet of the generator or the transformer, or both—as, for example, by lowering the field of the generator the voltage would drop, and, in consequence, the speed of the transformer, as would also the periodicity of the current supplied to the motors, and the effect may be carried still further by properly regulating the field of the transformer H. By supplying the motors with a heavy current at a low voltage and low periodicity, I am enabled to get a maximum amount of torque at a very slow speed, thus giving an easy start to the locomotive.

What I claim as new, and desire to secure by Letters Patent of the United States, is—

1. The combination in a self-contained electric locomotive, of a prime mover, direct-current generator and separately excited rotary transformer, with alternating motors mounted on or geared to the axles of the said locomotive, and means for varying the periodicity of the current supplied to the motors from the rotary transformer.

2. The combination in a self-contained electric locomotive, of a prime mover, a generator and rotary transformer, both separately excited, with alternating current motors mounted on the trucks of said locomotive, and means for regulating the fields of both generator and transformer and thus varying the periodicity of the supply current.

3. The combination in a self-contained electric locomotive, of a prime mover and separately excited generator and rotary transformer, with alternating current motors mounted on the trucks of said locomotive, and means for varying the speed of the prime mover, and regulating the field excitation of generator and transformer.

4. The combination in a self-contained electric locomotive, of a prime mover, a generator and rotary transformer, both separately excited, with an alternating current motor mounted on the trucks of said locomotive, and means for regulating by varying the field strength of the generator.

In witness whereof I have hereunto set my hand this 12th day of March, 1895.

EDWIN W. RICE, JR.

Witnesses:
B. B. HULL,
A. F. MACDONALD.